United States Patent
Shinogi et al.

[11] Patent Number: 6,057,585
[45] Date of Patent: May 2, 2000

[54] SEMICONDUCTOR ACCELERATION SENSOR

[75] Inventors: Masataka Shinogi; Yutaka Saitoh; Kenji Kato, all of Chiba, Japan

[73] Assignee: Seiko Instruments R&D Center Inc., Japan

[21] Appl. No.: 09/041,547

[22] Filed: Mar. 12, 1998

[51] Int. Cl.[7] .................................................... H01L 29/82
[52] U.S. Cl. ............................................ 257/419; 257/415
[58] Field of Search ...................................... 257/419, 415

[56] References Cited

U.S. PATENT DOCUMENTS

| | | |
|---|---|---|
| 4,699,006 | 10/1987 | Boxenhorn . |
| 5,265,470 | 11/1993 | Kaiser et al. . |
| 5,536,963 | 7/1996 | Polla . |
| 5,659,195 | 8/1997 | Kaiser et al. . |

Primary Examiner—Stephen D. Meier
Attorney, Agent, or Firm—Adams & Wilks

[57] ABSTRACT

A semiconductor acceleration sensor comprises a base having a first surface for receiving an acceleration force and a second surface disposed generally perpendicular to the first surface. A first detector is disposed on the second surface of the base for detecting an acceleration force in a horizontal direction of the base. A second detector is disposed on the second surface of the base for detecting an acceleration force in a vertical direction of the base. A support member is connected to one end of the base for supporting and fixing the base.

18 Claims, 8 Drawing Sheets

SEMICONDUCTOR ACCELERATION SENSOR

BACKGROUND OF THE INVENTION

1. Field of the Invention

This application claims the priority of European Patent Application no. EP 96201503.8 filed May 30, 1996 and U.S. Provisional Patent Application No. 60/025,121 filed on Aug. 30, 1996.

The present invention relates to a semiconductor device including a semiconductor acceleration sensor that converts a displacement into an electric signal using a piezoresistance effect of semiconductor crystal such as silicon, and more particularly to a field in which two-dimensional acceleration is obtained from one structural substance.

2. Description of the Related Art

Figure 2:
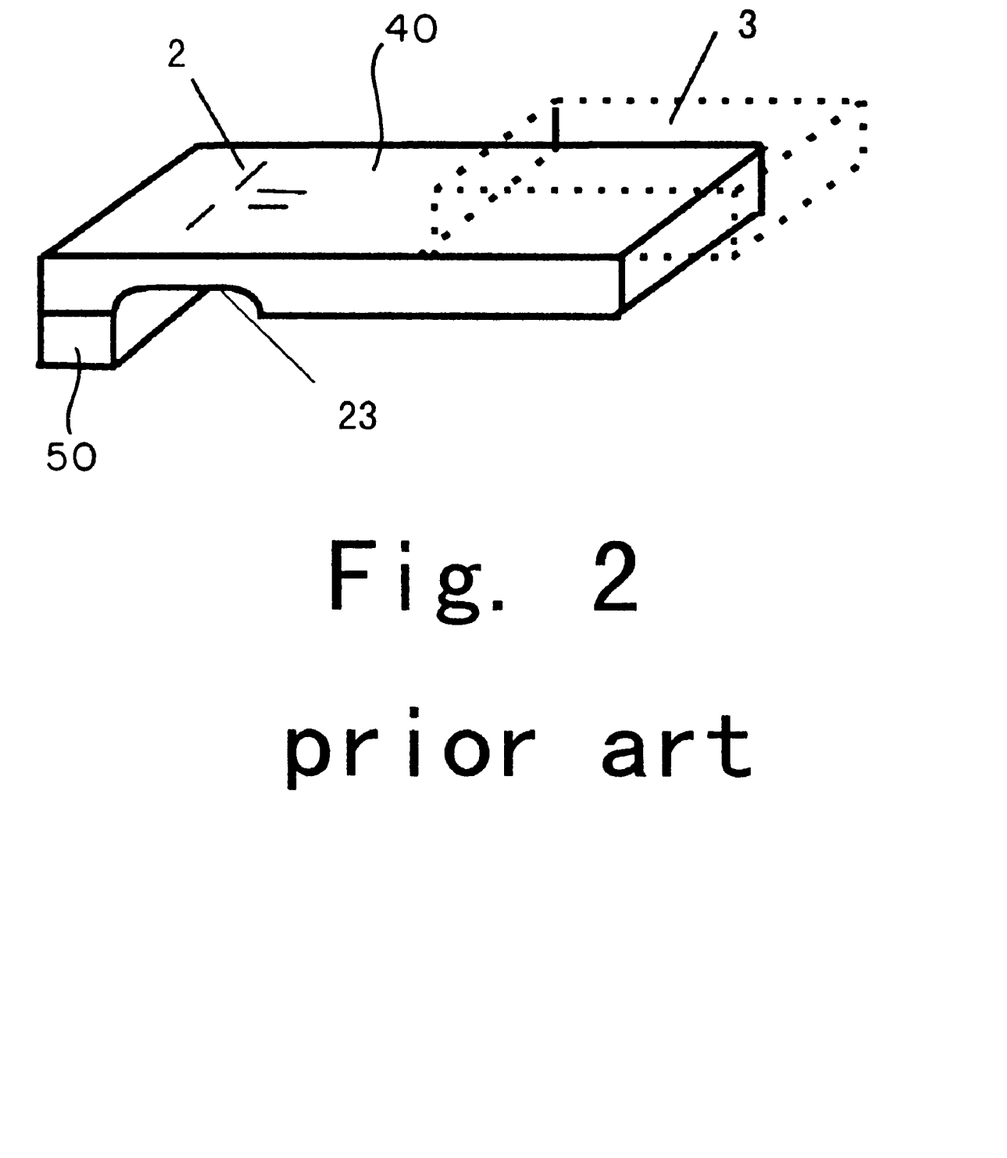
FIG. 2 is a perspective view showing a conventional semiconductor acceleration sensor.

FIG. 2 is a diagram showing a semiconductor acceleration sensor formed by micro-machining disclosed in Japanese Patent Unexamined Publication No. Hei 1-302167, in which a groove portion 23 is defined in the vicinity of a support of a cantilever by etching to provide a thin portion. A diffused resistor exists on a top surface of the sensor to constitute a bridge circuit. This structural substance is designed to detect one-dimensional acceleration.

Figure 3:
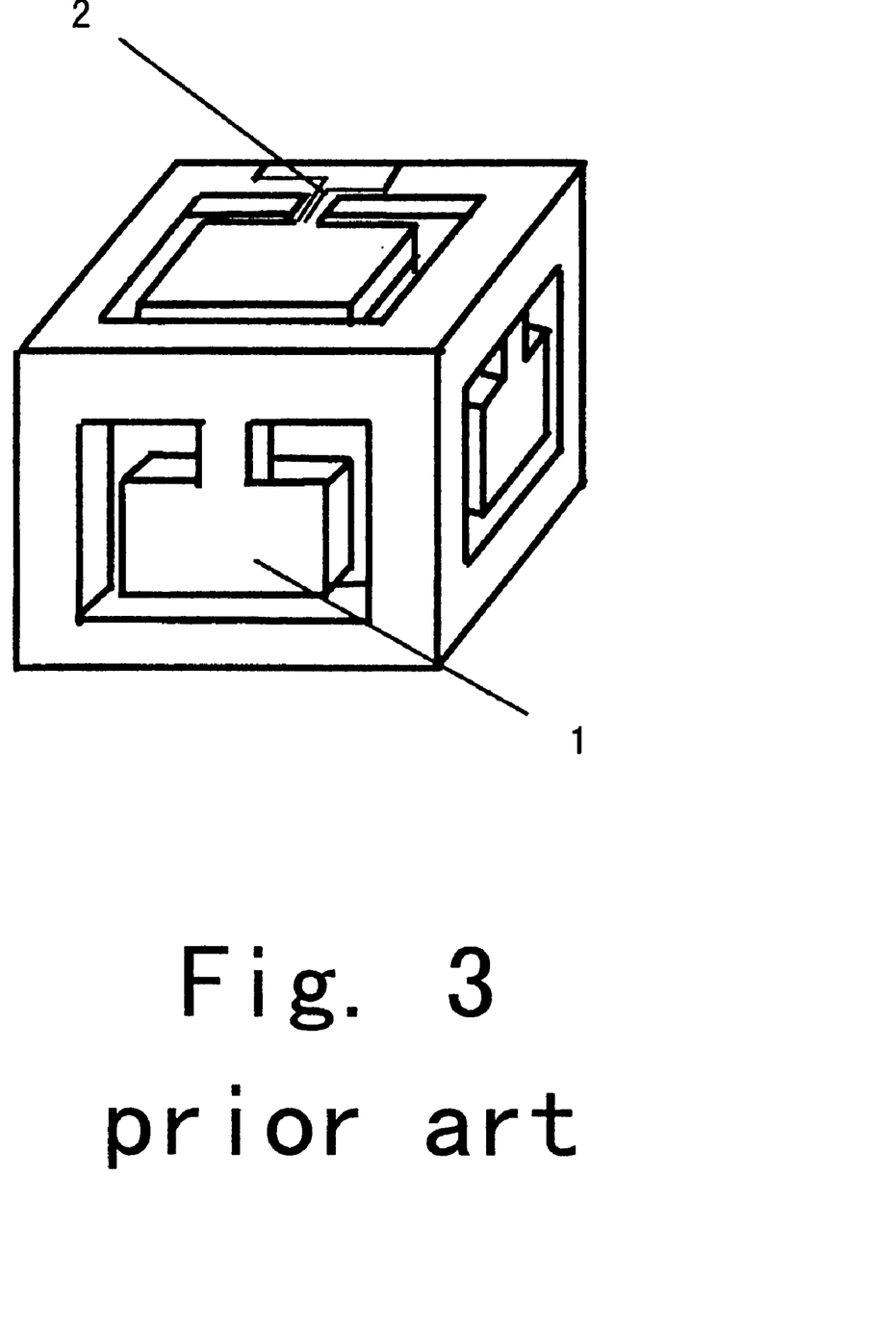
FIG. 3 is a perspective view showing a conventional semiconductor acceleration sensor.
Figure 4:
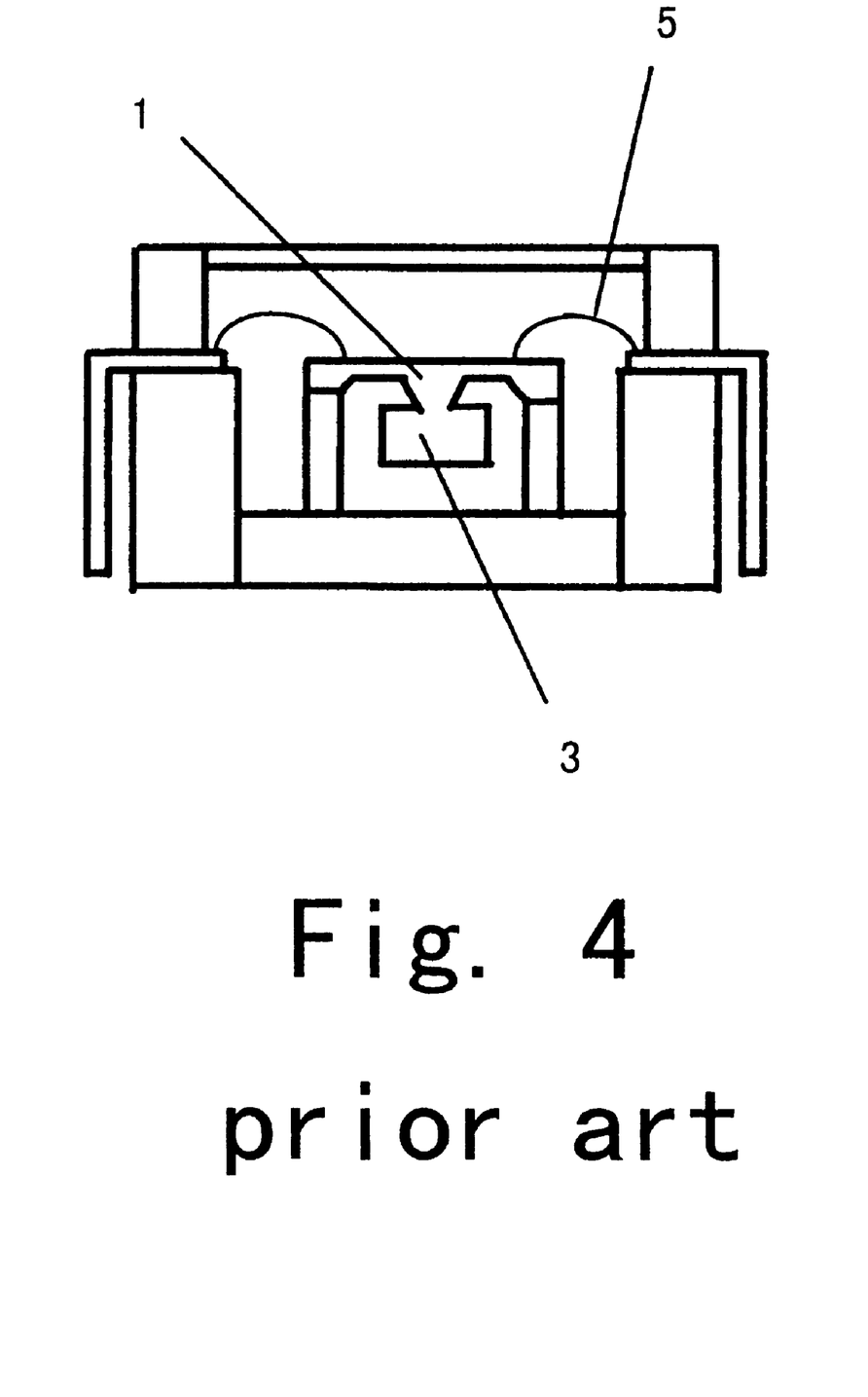
FIG. 4 is a perspective view showing a conventional semiconductor acceleration sensor.

Also, in the structures disclosed in Japanese Patent Unexamined Publication No. Sho 63-118667 shown in FIG. 3 and Japanese Patent Unexamined Publication No. Hei 3-202778 shown in FIG. 4, there is provided a structural substance that detects three-dimensional acceleration.

In the conventional semiconductor acceleration sensor, as shown in FIG. 2, a pair of diffused resistors 2 for detecting acceleration constitute a bridge circuit on the surface of the sensor. The acceleration sensor is designed to use the piezoresistance effect, thereby utilizing a phenomenon that a resistivity is changed according to a stress. In the case of detecting acceleration in two-axial or three-axial directions using the above structural substance, there is required the provision of at least two acceleration sensors in detectable directions. Also, in the case of fabricating the structural substances shown in FIGS. 3 and 4, there is required a technique of fabricating a three-dimensional structural substance, such as an etching technique. The above technique suffers from difficulties for high costs in producing the sensor.

SUMMARY OF THE INVENTION

The present invention has been made in view of the above circumstances, and therefore an object of the present invention is to provide a method of fabricating a two-axial acceleration sensor inexpensively and easily.

In order to solve the above problems, a diffused resistance 2, an output terminal 4 and so on are formed on a semiconductor wafer 10 by patterning. In this structure, the diffused resistance 2 is so disposed on the same surface as to detect acceleration in a horizontal direction 20 and in a vertical direction 21. After patterning formation, the device is cut out in the form of a die. In this example, there is used a dicing technique. Alternatively, a wire saw may be used. A support stand is arranged in such a manner that a surface of the device on which the diffused resistance 2 is provided is orthogonal to an acceleration detection surface. There is used a technique of forming a weight on a tip of the device of the cantilever structure. A p-type diffused resistance 2 is used. A value of the piezoresistance coefficient of semiconductor such as silicon is extremely larger than that of metal materials and exhibits remarkable anisotropy. The resistivity of p-type silicon increases under a tensile stress whereas it decreases under a compressive stress, and vice versa in case of the resistivity of n-type silicon. In the present invention, there is applied the detection of acceleration for a displacement of the device by detecting the compressive stress and the tensile stress simultaneously. In order to detect acceleration in two directions, according to the present invention, a surface of the device on which the diffused resistor 2 is provided is designed so as to detect the acceleration in the horizontal direction 20 and in the vertical direction 21. Also, the diffused resistances for detecting acceleration in the horizontal direction 20 and in the vertical direction 21 are formed on two opposite surfaces of the device, to thereby realize two-dimensional acceleration.

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments of the present invention with reference to the accompanying drawings.

Figure 1:
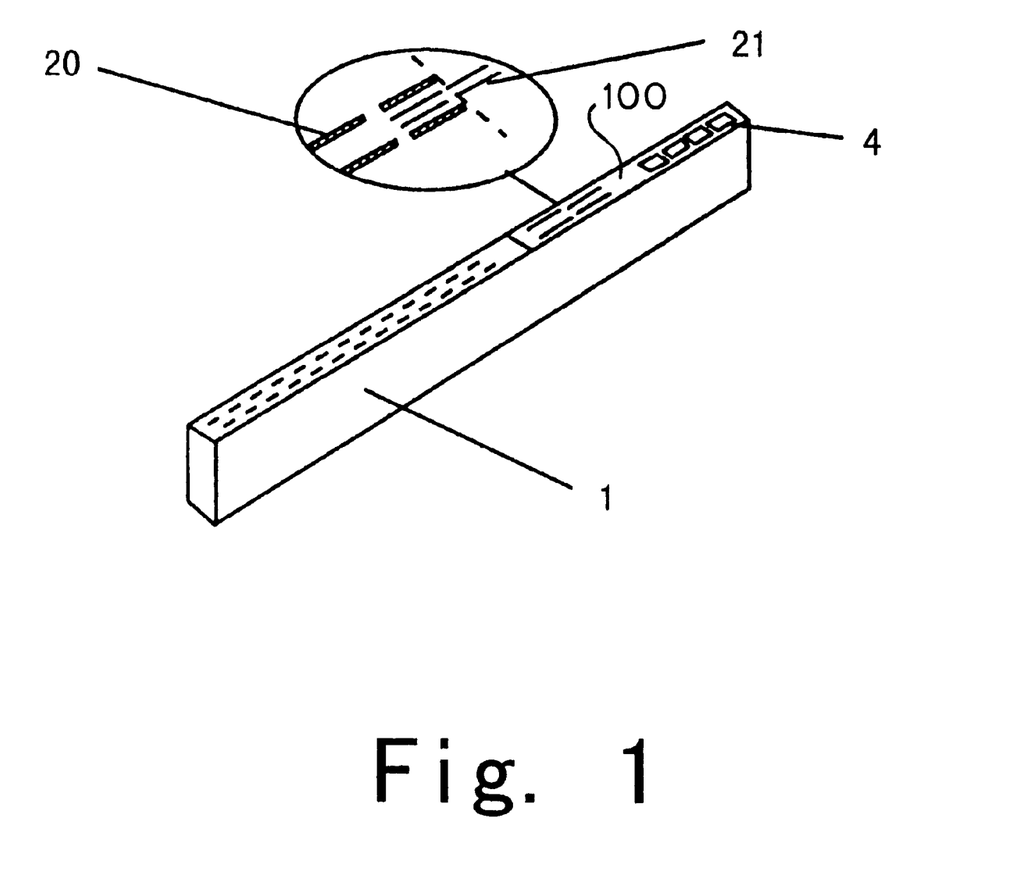
FIG. 1 is a perspective view showing a semiconductor acceleration sensor according to the present invention.

FIG. 1 shows a sensor device according to the present invention. On a side surface 100 of the sensor device 1 are formed diffused resistors 2 for detection, an output terminal 4 and other circuits. The diffused resistors 2 comprise diffused resistors 20 and 21 designed to provide diffused resistance for detection of acceleration in a horizontal direction and in a vertical direction, respectively. A method of manufacturing the acceleration sensor according to the present invention will be now described.

Figure 5A:
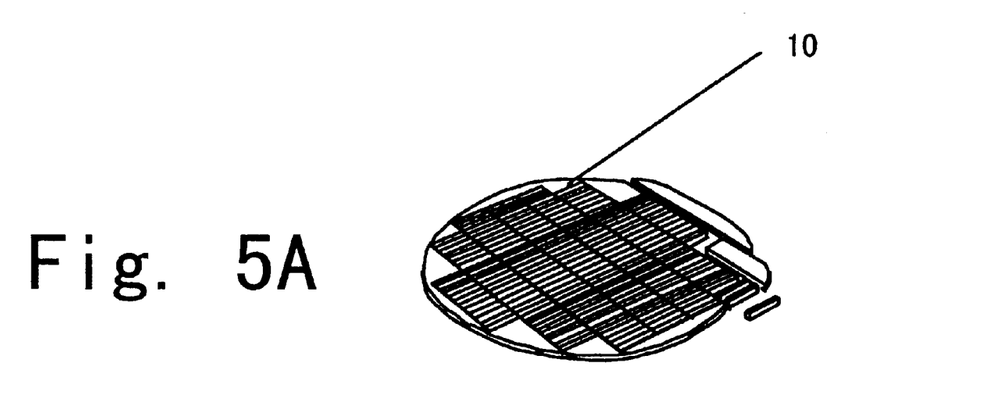
FIGS. 5A and 5B are process diagrams showing a method of manufacturing a semiconductor acceleration sensor according to the present invention.

The manufacturing method will be described with reference to FIGS. 5A, 5B and 6A and 6B. Initially, as shown in FIG. 5A, diffused resistors and an output terminal not shown are formed on a semiconductor wafer 10 by patterning. In this process, the semiconductor wafer 10 of (100) is used, and the respective elements are arranged along a <110> orientation by patterning. Also, a scribe line for cutting out is defined in advance. Further, a metal bump is formed on an output terminal portion not shown. The above process may be conducted on both surfaces of the semiconductor wafer 10. In patterning, an amplifier circuit, a temperature compensating circuit, etc. may be formed (FIG. 5A).

Figure 5B:
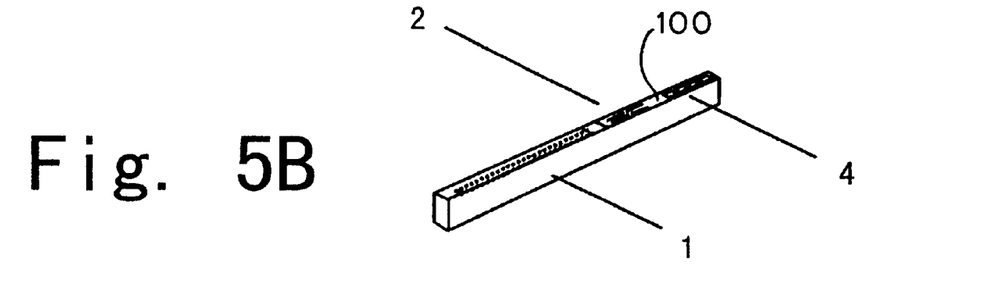

Subsequently, the device is extracted with a dicing unit on the basis of the scribe line. Although it is difficult to fix the semiconductor wafer onto a stage of the dicing unit because the bump is formed on the device, such fixing is conducted through wax in this embodiment. It is needless to say that a tape on which adhesive is coated may be used. The sensor device 1 having the diffused resistors and the output terminal is extracted from the semiconductor wafer 10 (FIG. 5B). In this manufacturing method, in order to obtain sensitivity in the vertical direction, the device needs to be thinned. In the present invention, there is used a method of thinning the device using a back-grinder unit. This method enables the thickness of the substrate to be controlled in micron order. Back grinding needs to be conducted in a process before the device is extracted from the dicing. It may not be used in sensitive ratio.

A weight 3 is added to the sensor device 1 for obtaining sensitivity. The material of the weight 3 is preferably a metal, such as molybdenum.

Figure 6A:
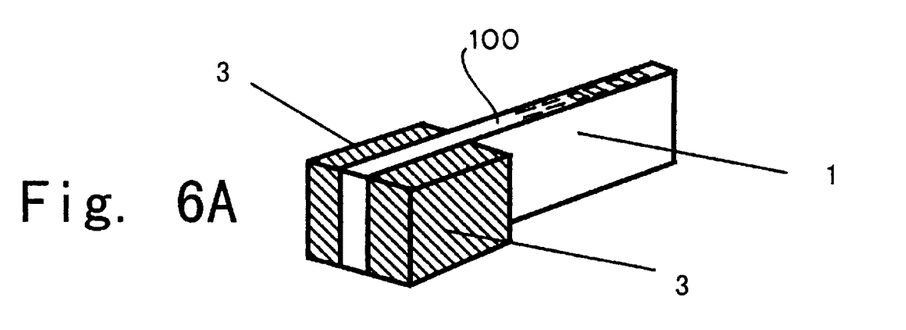
FIGS. 6A and 6B are process diagrams showing a method of manufacturing a semiconductor acceleration sensor according to the present invention.
Figure 6B:
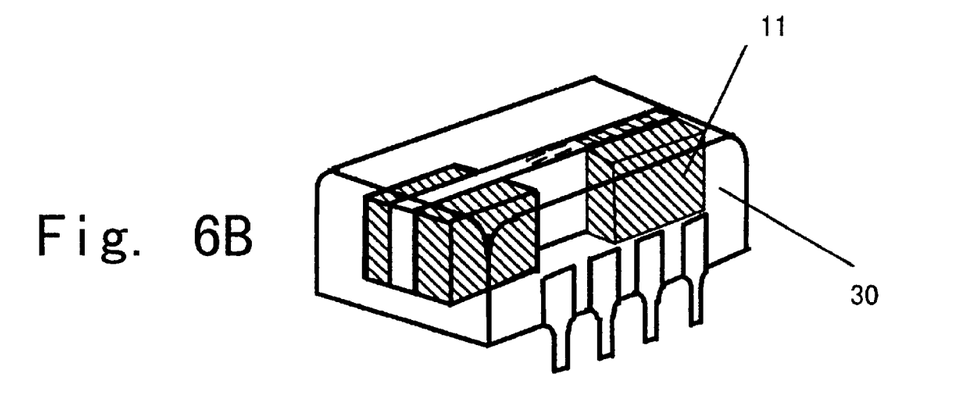

The above product is located on a support or pedestal 11. The pedestal 11 has wiring for extracting electric information from both surfaces of the sensor device 1. In this embodiment, ceramic is used for the pedestal 11, and wiring is conducted by gold. The sensor device 1 is fixed onto the pedestal 11 through adhesive, not shown. The most preferable fixing method is a method of eliminating hydrogen in which hydrogen radicals are adhered onto the surface of the pedestal 11 and then heated at about 300° C. The electric connection between the wiring of the pedestal 11 and the sensor device 1 is performed by an anisotropic conductive film in this embodiment. The anisotropic conductive film is a film where fine conductive grains are dispersed in the adhesive. The grains are interposed between electrodes by thermo compression bonding so that the electrodes are rendered conductive, the isolation of the adjacent electrodes are kept, and mechanical joint is made by hardening the adhesive. This method renders conductive to the bump and the output terminal 4 through the conductive grains. This method is excellent because no mechanical stress is applied to the sensor device 1. Alternatively, connection using a wire may be applied (FIGS. 6A and 6B).

Also, in an MID (mold inter-connect device) where wiring can be formed on a wall surface of a package 30 using liquid-crystal polymer, it is a very convenient method because a system in which the terminal formed on the wall surface of the package 30 and the terminal of the sensor device 1 are aligned, and adhesive is inserted therebetween.

The semiconductor acceleration sensor is structured to mainly include the sensor device 1, the pedestal 11 for extracting an electric signal from the sensor device 1 and also supporting the sensor device 1, the weight 3 for obtaining the sensitivity, and the package 30.

Figure 7:
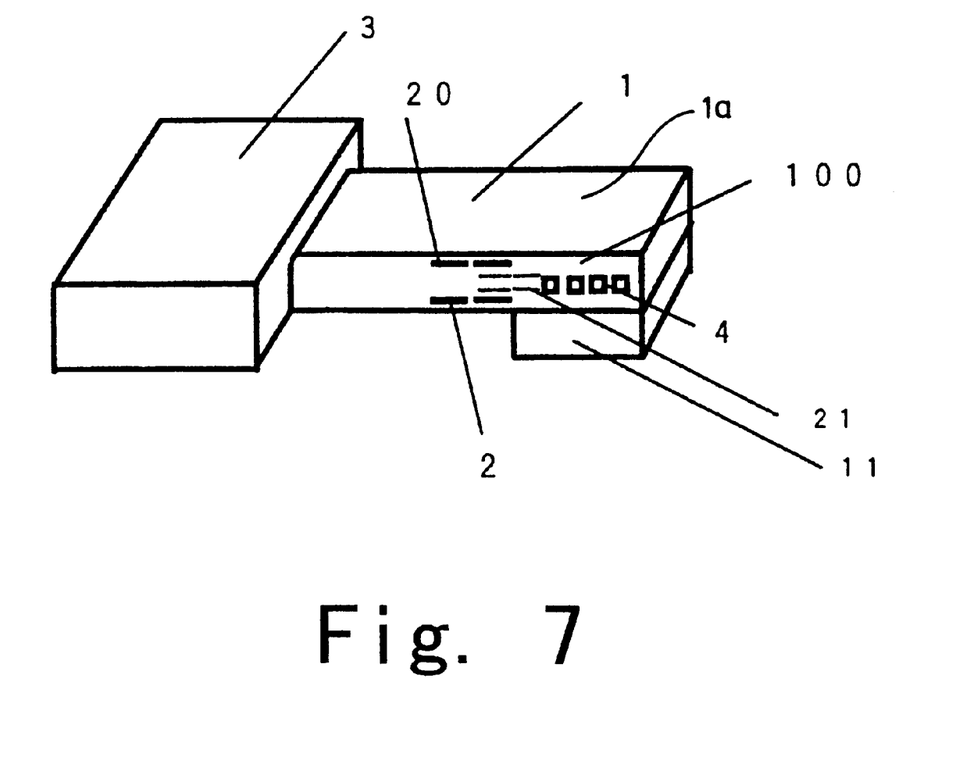
FIG. 7 is a perspective view showing another semiconductor acceleration sensor according to the present invention.

The detection principle is of a system in which the diffused resistor 2 on the side surface 100 allows the sensor device 1 to be warped by applied acceleration, and the diffused resistor 2 disposed on the side surface 100 is changed in resistance, to thereby detect the acceleration received by a surface 1a of the sensor device. In the present invention, there is used a full-bridge circuit where four diffused resistors 2 are changed in resistance. A representative structure thereof is shown in FIG. 7. The diffused resistors appear in a front of the drawing.

The detection diffused resistors 2 for detecting acceleration in two directions are designed to connect the diffused resistors 20 for detection of acceleration in the horizontal direction to each other through the bridge circuit in the vicinity of the pedestal 11 as shown in FIG. 1. Also, two diffused resistors 21 for detection of acceleration in the vertical direction form a detector resistor and a half-bridge circuit employing those two diffused resistors as a reference resistor. The diffused resistors 2 are of p-type and designed in such a manner that a diffused region is determined by using a locus process. The size of the diffused resistors 2 is set to be 250 µm in length and 7 µm in width. The specification of the respective diffused resistors of this type are 5 KΩ.

Figure 8A:
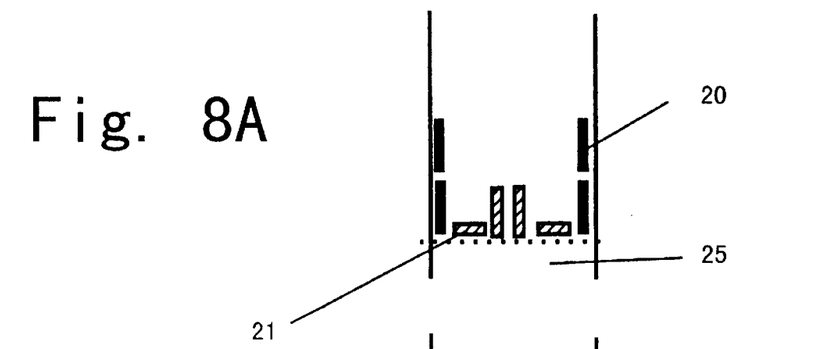
FIGS. 8A to 8C are diagrams showing an arrangement of a diffused resistance according to the present invention.
Figure 8B:
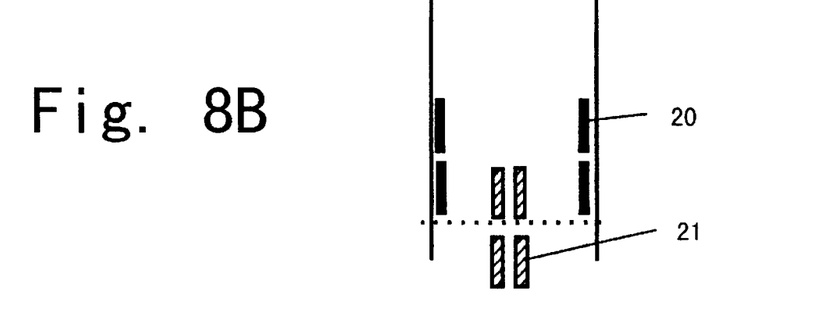
Figure 8C:
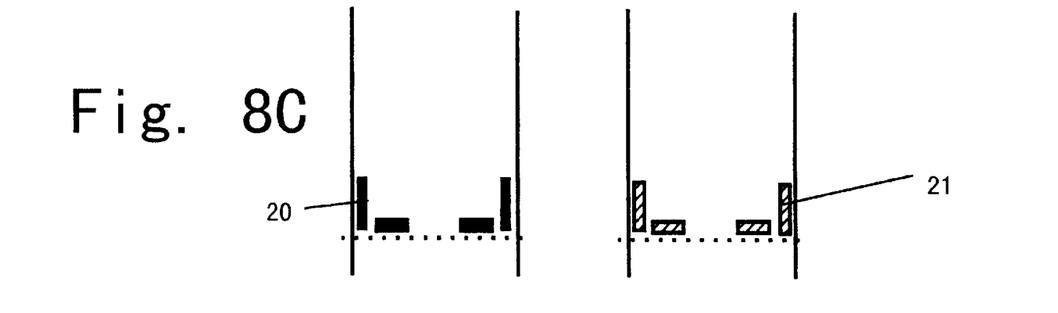

The arrangement of other diffused resistors 2 for detection of acceleration in two directions is shown in FIGS. 8A to 8C. Diffused resistors 2 indicated by solid lines are for detection of acceleration in a horizontal direction, and diffused resistors 2 indicated by oblique lines are for detection of acceleration in a vertical direction. Further, a support portion 25 is below a dot line. In FIG. 8A, the diffused resistors 21 are so disposed as to be orthogonal to each other. This uses a warp resistance in the crystal orientation <110>. This system suffers from the defect that an area is increased and the width of the sensor device is thickened because of an orthogonal arrangement. This arrangement requires that the resistance value of the diffused resistors become heightened even if it is shortened. FIG. 8B shows a system in which the diffused resistors 20 and 21 for detection in the horizontal direction and the vertical direction, respectively are disposed in a longitudinal direction of the sensor device 1. In this system, the diffused resistors 21 for detection of acceleration in the vertical direction form a half-bridge. FIG. 8C shows a structure in which the diffused resistors 20 for detection of acceleration in the horizontal direction and the diffused resistors 21 for detection of acceleration in the vertical direction are made up of four diffused resistors 2, respectively, to detect detection directions.

The specification of the sensor according to the present invention will be described. The sensor device 1 is set to be 6 mm (L1=4 mm, L2=2 mm) in length l, 0.15 mm in width w, and 0.15 mm in thickness. In order to obtain the sensor device 1 having the specification of this size, the semiconductor wafer 10 needs to be subjected to back-grinding in advance. Back grinding enables the semiconductor wafer 10 to be ground with high accuracy and flatly because it can perform control of micron order. The size of the bump on the output terminal 4 is set to be 0.1×0.08 mm, and its height is set to be 0.1 mm. The weight 3 has 30 mg. With this size, in the arrangement of the diffused resistors 2 as shown in FIG. 8B, two-dimensional acceleration is detected. The specification of the diffused resistors 2 is 250 µm in length and 7 µm in width. As a result of detecting gravity, 3 mV is outputted for detection of acceleration in the horizontal direction, and 1.5 mV is outputted for detection of acceleration in the vertical direction.

In another embodiment, the sensor device 1 is made larger so as to be 6 mm (L1=4 mm, L2=2 mm) in length l, 0.6 mm in width w, and 0.15 mm in thickness. With this size, outputs different in sensitivity ratio between the horizontal direction and the vertical direction are obtained. What is recently used in an automobile field is a safety device for saving a life from a side collision, which is a so-called "side air bag". In case of the side collision, a distance between a human body and a part as collided is short, and the open/close operation of a door impacts on the side air bag. Therefore, the sensitivity may be lower than that in case of a head-on collision by one order. Under the circumstances, using the function of the present invention, a sensor that can sense the head-on collision and the side collision can be provided. According to the present invention, there is a merit that two-dimensional acceleration can be obtained in a desired sensitivity ratio. According to the present invention, there can be provided a sensor that can detect two-dimensional acceleration with high accuracy by mechanical processing.

As was described above, the above-mentioned structure of the sensor according to the present invention has the following advantages.

1) The two-dimensional acceleration can be readily detected by one device.

2) The sensitivity ratio of the two-dimensional acceleration can be changed and outputted.

3) A device that can be provided readily and inexpensively can be fabricated.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for detecting and processing a specular image density level $X_1$ and a highlight image density level $X_2$ in an illuminated scene comprising:

exposing a photo-sensitive means by a luminous image from said scene, thereby generating a plurality of digital image signals, each said digital image signal representing a density of a portion of said luminous image;

establishing a cumulative histogram for the image density levels of said digital image signals;

providing a reference specular cumulative frequency $Y_1$;

2. A semiconductor acceleration sensor as claimed in claim 1; further comprising a weight disposed on an end portion of the base.

3. A semiconductor acceleration sensor as claimed in claim 2; wherein the weight comprises a bump.

4. A semiconductor acceleration sensor as claimed in claim 1; wherein the detecting portion comprises a plurality of diffused resistors.

5. A semiconductor acceleration sensor as claimed in claim 1; wherein the opposite surfaces of the base extend in a thickness direction of the base.

6. A semiconductor acceleration sensor comprising: a base having a first surface for receiving an acceleration force and a second surface disposed generally perpendicular to the first surface; first detecting means disposed on the second surface of the base for detecting an acceleration force in a horizontal direction; second detecting means disposed on the second surface of the base for detecting an acceleration force in a vertical direction; and a support member for supporting and fixing one end of the base.

7. A semiconductor acceleration sensor as claimed in claim 6; further comprising a weight disposed on an end portion of the base.

8. A semiconductor acceleration sensor as claimed in claim 7; wherein the weight comprises a bump.

9. A semiconductor acceleration sensor as claimed in claim 6; wherein each of the first detecting means and the second detecting means comprises at least one diffused resistor.

10. A semiconductor acceleration sensor as claimed in claim 6; wherein the second surface of the base extends in a thickness direction of the base.

11. A semiconductor acceleration sensor comprising: a base having a first surface and a second surface disposed generally perpendicular to the first surface; a detecting section disposed on the second surface of the base for detecting an acceleration force in a horizontal direction and detecting an acceleration force in a vertical direction; and a support member connected to a portion of the first surface of the base for supporting and fixing one end of the base.

12. A semiconductor acceleration sensor as claimed in claim 11; wherein the base has a third surface for receiving an acceleration force and disposed generally perpendicular to the second surface.

13. A semiconductor acceleration sensor comprising: a base having a first surface and a second surface for receiving an acceleration force and disposed generally perpendicular to the first surface; a detecting section disposed on the second surface of the base, the detecting section having a first detector for detecting an acceleration force in a horizontal direction and a second detector for detecting an acceleration in a vertical direction; and a support member connected to a portion of the first surface of the base for supporting and fixing one end of the base.

14. A semiconductor acceleration sensor as claimed in claim 13; wherein the second detector comprises a half-bridge circuit having a pair of reference diffused resistors and a pair of detecting diffused resistors.

15. A semiconductor acceleration sensor comprising: a base having first surfaces for receiving an acceleration force an a second surface disposed generally perpendicular to the first surfaces; a detecting section disposed on the second surface of the base, the detecting section having a first detector for detecting an acceleration in a horizontal direction and a second detector for detecting an acceleration in a vertical direction; and a support member connected to a portion of the first surfaces for supporting and fixing one end of the base.

16. A semiconductor acceleration sensor comprising: a semiconductor substrate having a first surface for receiving an acceleration force and a pair of second opposite surfaces disposed generally perpendicular to the first surface, each of the second opposite surfaces having a detecting section for detecting a variation of a physical quantity in two axial directions of the semiconductor substrate due to the acceleration force applied to the first surface; and a support for supporting and fixing the semiconductor substrate.

17. A semiconductor acceleration sensor as claimed in claim 16; wherein the detecting section comprises a plurality of diffused resistors.

18. A semiconductor acceleration sensor as claimed in claim 17; wherein the detecting section comprises a plurality of diffused resistors for detecting the acceleration force in a horizontal direction and a plurality of diffused resistors for detecting the acceleration force in a vertical direction.

* * * * *